United States Patent
Sternowski (10) Patent No.: US 11,346,916 B2
(45) Date of Patent: May 31, 2022

(54) GEOLOCATION OF AN ELECTROMAGNETIC EMITTER UTILIZING RECEPTOR PATTERN SLOPE

(71) Applicant: Softronics, Ltd., Marion, IA (US)

(72) Inventor: Robert H. Sternowski, Cedar Rapids, IA (US)

(73) Assignee: Softronics, Ltd., Marion, IA (US)

( * ) Notice: Subject to any disclaimer, the term of this patent is extended or adjusted under 35 U.S.C. 154(b) by 0 days.

(21) Appl. No.: 17/466,410

(22) Filed: Sep. 3, 2021

(65) Prior Publication Data

US 2022/0065975 A1     Mar. 3, 2022

Related U.S. Application Data

(60) Provisional application No. 63/073,987, filed on Sep. 3, 2020.

(51) Int. Cl.
    *G01S 3/32*     (2006.01)
    *G01S 5/04*     (2006.01)
    *G01S 3/18*     (2006.01)

(52) U.S. Cl.
    CPC ............... *G01S 3/32* (2013.01); *G01S 3/18* (2013.01); *G01S 5/04* (2013.01)

(58) Field of Classification Search
    CPC ..... G01S 3/16; G01S 3/18; G01S 3/28; G01S 3/30
    See application file for complete search history.

(56) References Cited

U.S. PATENT DOCUMENTS

| | | | |
|---|---|---|---|
| 5,218,360 A * | 6/1993 | Goetz | G01S 3/28 342/196 |
| 7,427,954 B2 | 9/2008 | Vaughn, Jr. | |
| 2002/0002066 A1 * | 1/2002 | Pallonen | G01S 3/28 455/562.1 |
| 2011/0133987 A1 * | 6/2011 | Bernsten | G01S 3/16 342/417 |
| 2012/0199755 A1 * | 8/2012 | Generazio | G01T 1/00 250/395 |
| 2013/0027251 A1 | 1/2013 | Lu | |
| 2020/0142020 A1 * | 5/2020 | Gorisse | G01S 3/30 |

FOREIGN PATENT DOCUMENTS

| | | | | |
|---|---|---|---|---|
| EP | 2492706 A1 * | 8/2012 | ............... | G01S 3/28 |
| EP | 2851262 A1 * | 3/2015 | ............... | B61L 3/121 |
| JP | 2000188566 A * | 7/2000 | ............... | G01S 3/28 |

* cited by examiner

*Primary Examiner* — Bernarr E Gregory
*Assistant Examiner* — Fred H Mull
(74) *Attorney, Agent, or Firm* — Shuttleworth & Ingersoll, PLC; Jason R. Sytsma (57) ABSTRACT

Directional antennas comprising substantially identical radiation patterns separated in a horizontal plane by an index angle. A line of bearing to an emitter is determined by a ratio of the power level of an EM signal received by the directional antennas and comparing it to a lookup table to determine an angle off of the boresight of the directional antenna with the highest received power level of the EM signal toward the directional antenna with the second-highest received power level of the EM signal that the emitter of the EM signal is located.

18 Claims, 9 Drawing Sheets

Identical antennas of an array proximity to each other

SIDE VIEW

FIG.4A

Identical antennas of an array proximity to each other

TOP VIEW

GEOLOCATION OF AN ELECTROMAGNETIC EMITTER UTILIZING RECEPTOR PATTERN SLOPE

CROSS-REFERENCE TO RELATED APPLICATIONS

The present application U.S. Provisional Patent Application No. 63/073,987 filed Sep. 3, 2020, which is incorporated herein by reference.

TECHNICAL FIELD

This disclosure relates to determining locations of emitters, and, more specifically, this disclosure relates to determining a line of bearing of electro-magnetic (EM) emitters based a ratio of received power levels.

BACKGROUND INFORMATION

It is often necessary to establish the location of a radio transmitter. This may be for rescue, military, security or any of a variety of other reasons. Various methods have been devised over the course of radio communication's evolution to allow locating an unknown transmitter.

One solution is known as a phased array (aka, Adcock). In this solution a multiplicity of antennas (2 minimum) are spaced and connected with a known phase relationship at the exact unknown transmitter frequency. The antenna is physically rotated until a null in received signal power is achieved on the single companion receiver. This establishes a line-of-bearing (LOB). At least two intersecting lines of bearing from two geographically separated phased array systems are needed to geolocate the target transmitter. The size and spacing/arrangement of the antennas is frequency dependent. A variant of this scheme commonly referred to as a "Doppler DF" system uses an electronic switching system in place of physically rotating the antenna array to more rapidly establish the LOB with a single receiver.

Another solution is using the antenna pattern. A highly directive antenna is physically rotated until a peak in received signal power is achieved on the single companion receiver. This establishes a line-of-bearing (LOB). At least two intersecting lines of bearing from two geographically separated directive antennas are needed to geolocate the target transmitter. The size of the antennas is frequency dependent.

Yet another solution is time difference of arrival (TDOA). A TDOA system employs a multiplicity of antennas (2 minimum) connected to a multiplicity of receivers (one per antenna). The antenna interconnection has a known constant phase relationship, and the receivers have a known constant phase relationship, as well as being phase-locked together. Each antenna/receiver pair is tuned to the same frequency, and the difference in time of arrival at each antenna/receiver is determined. From those differences, the LOB to the received signal can be trigonometrically determined. At least two intersecting lines of bearing from two geographically separated phased array systems are needed to geolocate the target transmitter. The size and spacing of the antennas is frequency dependent.

Yet another solution is the frequency difference of arrival (FDOA). An FDOA system employs a single receiver and antenna, and measures the Doppler shift of the target transmitter's signal. This requires that either the target transmitter OR the receivers (or both) are in motion so as to cause a measurable Doppler shift in the signal frequency at the receiver. From the motion vector of a moving-receiver/fixed transmitter or fixed-receiver/moving-transmitter, an LOB can be mathematically determined. At least two intersecting lines of bearing from two geographically separated FDOA systems are needed to geolocate the target transmitter. The size of the antennas is frequency independent.

Finally, there is power difference of arrival (PDOA). A PDOA scheme utilizes one or more receive locations (a single mobile platform may also be used if the target signal is continuous) each with a single receiver, a simple omni-directional frequency-independent antenna, a known location or a location measurement instrument (i.e. GPS receiver), and signal power measurement. From a set of dispersed power measurements at known locations one can compute a locus of points for each measurement pairing upon which the transmitter must be located. Four or more intersecting loci from randomly dispersed measurement points are then overlaid to establish the unambiguous transmitter location.

As can be seen from this summary of prior art solutions in radio geolocation and direction finding, all prior schemes require a large frequency-dependent antenna system, one or more receivers, and in the case of FDOA precisely known motion vectors. The frequency-dependent antenna systems in particular restrict operation to a narrow bandwidth of frequencies, complicating geolocation tasks in an ever-expanding span of employed frequency channels.

Accordingly, there is a need for a simpler solution.

SUMMARY

In accordance with one aspect of the present invention, a system for determining a line of bearing to an emitter of an electromagnetic signal (EM) is disclosed. The system comprises at least three EM sensors, which can be implemented as directional antennas, each of which comprising substantially identical radiation patterns separated in a horizontal plane by an index angle. At least one power measurement device is connected to the at least three EM sensors for determining a power level of the EM signal. In another embodiment, a distinct power measurement device can be connected to each EM sensor. A processor is connected to the at least one power measurement device to receive the power level of the EM signal at each of the at least three EM sensors and to calculate a ratio of the power level of the at least three EM sensors and from the ratio determine the line of bearing to the emitter. The ratio of the power level of the at least three EM sensors must be between 0 and K, where K is a maximum reception point at boresight divided by a minimum reception point at an angle from boresight equal to the index angle, in order to provide a solution to the line of bearing. The line of bearing to the emitter is determined from a lookup table stored in memory of the processor comprising a ratio between 0 and K, inclusive, and a corresponding angle between 0 and ½ times the index angle, inclusive.

In another embodiment, a tuner, an analog to digital converter and an FFT engine in communication and associated with each of the at least three EM sensors for determining a power level of the received signal from the emitter at a particular point in time and storing an output of each FFT engine in storage memory is disclosed. A line of bearing engine is in communication with the storage memory for obtaining from the storage memory at the particular point in time the power level for the EM sensor of the at least three EM sensors with the highest power level and EM sensor with the second highest power level and determining therefrom the ratio of the power level and from the ratio of the power level determine the line of bearing to the emitter. The line of bearing engine is in communication with a lookup table comprising a ratio between 0 and K, inclusive, and a corresponding angle between 0 and ½ times the index angle, inclusive, from which to determine the line of bearing off of a boresight of the EM sensor of the at least three EM sensors with the highest power level toward the EM sensor of the at least three EM sensors with the second highest power level.

In yet another embodiment, at least one elevation EM sensor comprising a substantially identical radiation pattern of the at least three EM sensors and separated from the at least three EM sensors in a vertical plane. The at least one elevation EM sensor is connected to the at least one power measurement device for determining the power level of the EM signal. The processor receives the power level of the EM signal at the at least one elevation EM sensor and determines a variation in the power level of the EM signal simultaneous to and with respect to the power level of the EM signal at the at least three EM sensors.

In yet another embodiment, a method for determining a line of bearing to an emitter of an electromagnetic signal (EM) based on a power level of the EM signal is disclosed. The method comprises of determining the power level of the EM signal from at least three EM sensors each of which comprising substantially identical radiation patterns separated in a horizontal plane by an index angle. The method continues by identifying which of the at least three EM sensors is oriented most directly toward the emitter based on the power level of the EM signal by the at least three EM sensors. The method continues by determining the line of bearing to the emitter based on a ratio of the power level of the EM signal from two EM sensors of the at least three EM sensors relative to an index angle between the two EM sensors.

In an embodiment of the method, the at least three EM sensors each comprises a boresight, and wherein determining the line of bearing to the emitter further comprises determining which of the at least three EM sensors is most directly oriented toward the emitter based on which of the at least three EM sensors is receiving the EM signal at the highest power level. The method continues by determining the line of bearing to the emitter by determining which of the at least three EM sensors is second-most directly oriented toward the emitter based on which of the at least three EM sensors is receiving the EM signal at a second-highest power level. The method continues by calculating a ratio of the power level from: (i) the power level of the EM signal received by the EM sensor receiving the EM signal at the highest power level; and (ii) the power level of the EM signal received by the EM sensor receiving the EM signal at the second-highest power level. The method continues by comparing the ratio of the power level to a lookup table to determine an angle off of a boresight of the EM sensor receiving the EM signal at the highest power level toward the EM sensor receiving the EM signal at the second-highest power level.

In an embodiment, the method continues by obtaining a lookup table comparing the ratio of the power level of the EM signal from two EM sensors with an angle off of a boresight of one of the EM sensors, wherein the angle off of the boresight ranges between 0° to ½ index angle, inclusive, between the two EM sensors, and wherein the ratio of the power level in the lookup table ranges from 0 to K, inclusive.

In yet another embodiment, the method continues by determining the power level of the EM signal with an elevation EM sensor separated from the at least three EM sensors in a vertical plane and determining a variation in the power level of the EM signal simultaneous to and with respect to the power level of the EM signal at the at least three EM sensors and determining therefrom an elevation in the line of bearing to the emitter.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Disclosed is a solution to greatly simplify the complexity of a geolocation system with an energy measurement device (one per antenna) that optionally isolates only a single emitter signal of interest, an array of identical directional EM sensors, and software hosted in a suitable computer to synchronously compare the ratio of signal energy among the EM sensors. A line of bearing to the emitter from the receive EM sensor array location can be determined, which is then overlaid with a line of bearing from one or more other similar receive systems to establish the unambiguous transmitter location from the lines of bearing. The solution takes advantage of the slope of the azimuth directional pattern of a directional EM sensor. The elevation of the incoming signal can also be determined to precisely locate the emitter.

The following descriptions will utilize a radio system and location of a radio emitter for illustration, although the general principles apply equally to any electromagnetic system with suitable functionally equivalent components.

Figure 1:
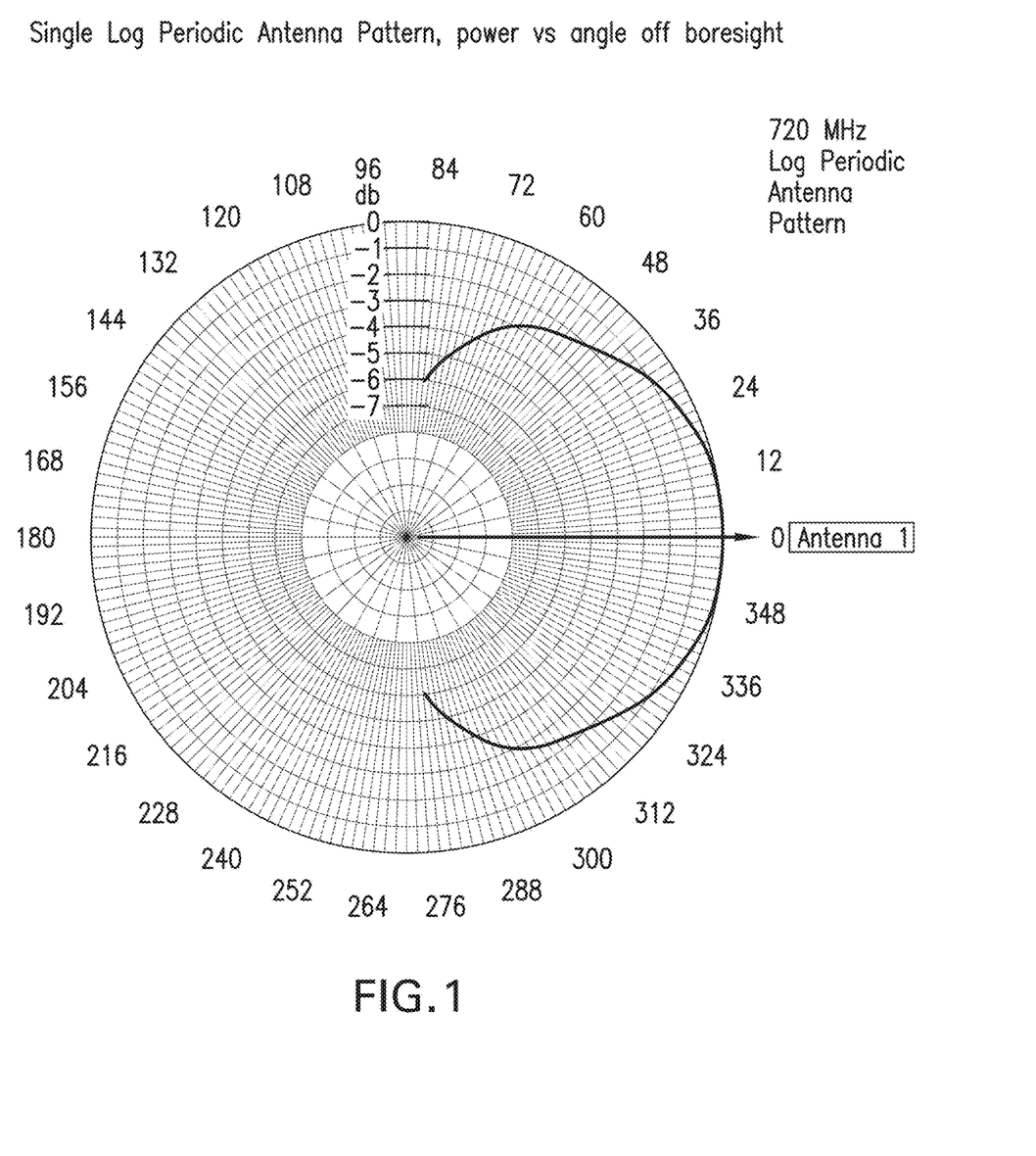
FIG. 1 is a polar graph showing single LOG periodic antenna pattern of power vs. angle off boresight.

Referring to FIG. 1, the azimuthal pattern, at zero elevation angle is that of a log periodic antenna, a well-known type of directional antenna with very broad frequency bandwidth at a frequency of 720 MHz, again for illustrative purposes. It should be noted that EM sensor 102 can comprise any type of antenna, coil, sensor (electro, magnetic, or electro-magnetic), meter, or device. The illustrated embodiment is that of a directional antenna. Note that the amount of signal power declines as the angle of the antenna boresight (e.g., angle of maximum power reception relative to the emitter) is increased to either side of the emitter's location. That is, the boresight is the axis of maximum gain of a directional antenna. That variation in received power may vary linearly or nonlinearly with the angular displacement depending on the specific antenna type used. That is not relevant to the operation of the disclosed invention, as long as an array of identical antennas is used. The variation in power versus boresight angle is very small nearest a boresight angle of zero (0) degrees. For the particular antenna used for illustration, the variation in power is approximately −1 db for a ±30 degree change in angle from boresight (a slope of approximately 0.03 db/degree). From ±30 to ±82 degrees, there is an additional −5 db variation in power (a range of ±52 degrees, for a slope of approximately 0.1 db per degree). A key principle of the solution herein disclosed is utilizing the high slope (rate of change of power vs angle) portion of the antenna pattern to determine a line of bearing. A consideration for selection of an antenna is maximizing the slope of the directive antenna pattern, and secondarily having as linear a slope as possible.

Figure 2:
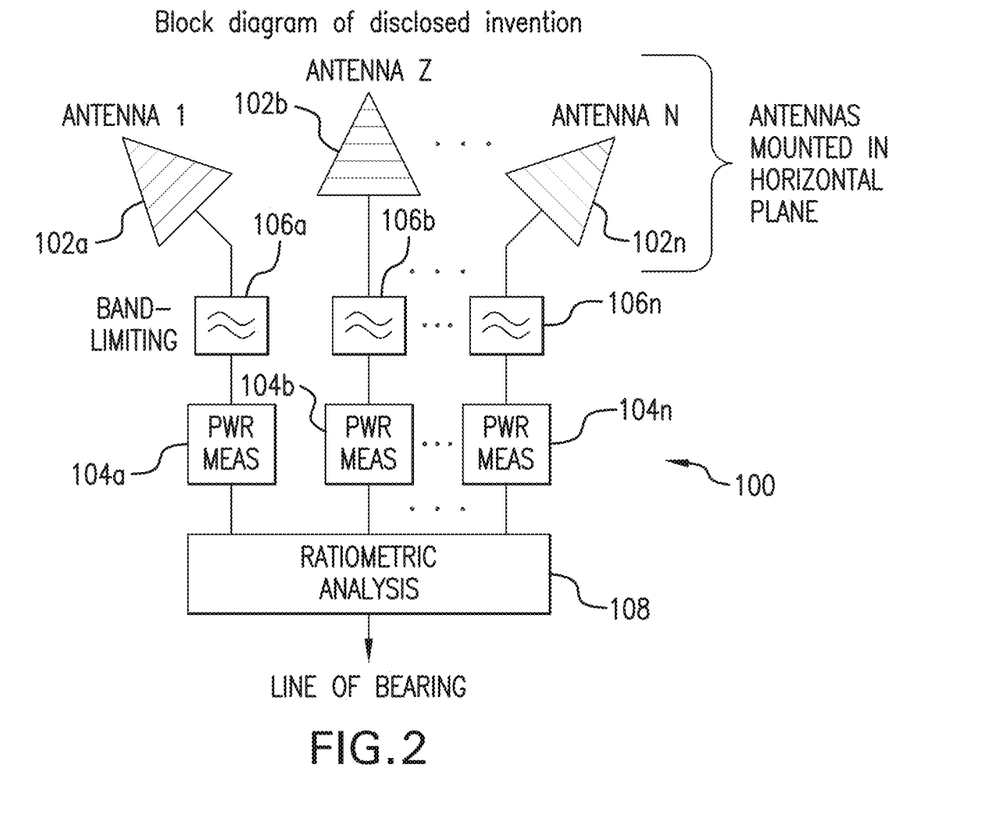
FIG. 2 is a block diagram of a system for determining a line of bearing.

FIG. 2 shows a block diagram of a system 100 for determining a line of bearing to an emitter at an undetermined location. System 100 uses an array of identical EM sensors 102a-102n to determine precise power measurements from a power measurement devices 104a-104n connected to corresponding EM sensors 102a-102n. Alternatively, a single power measurement device 104 can be rapidly switched to each of EM sensors 102a-102n. A band-limiting filter 106a-106n can be connected between corresponding EM sensors 102a-102n and power measurement devices 104a-104n to provide only the frequency ranges of interest. Variations or nonlinearities in the patterns of the EM sensors 102 are inconsequential as long as all EM sensors 102 have the same radiation pattern and nonlinearity. The radiation pattern for each EM sensor 102 can be calibrated for each frequency used for line of bearing determination if angular determination finer than half the index angle is to be measured.

While the examples herein disclosed are shown for a 720 MHz frequency of interest, any frequency of interest above or below that range can be used, including 0.1 Hz through frequencies in the Ehz (and any frequency of interest in between this range), which includes extremely low frequencies, through radio waves and microwaves, and through the light spectrum, and to Gamma rays. It should also be known that the applications herein disclosed are equally applicable to determining a line of bearing to any emitter emitting waves that exhibit a free-space path loss of $(4\pi d/\lambda)^2$.

A processor 108 is connected to power measurement device(s) 104 to determine the line of bearing to the emitter. Processor 108 can be implemented in a receiver or separate from a receiver. Processor 108 determines which EM sensor 102a-102n and its corresponding power measurement device 104a-104n has the largest received amplitude/power level and which EM sensor 102a-102n adjacent to it has the second highest received amplitude/power level. The line of bearing to the emitter must lie between EM sensor 102a-102n with the highest received power level and the second highest received power level (inclusive). More specifically, the line of bearing must lie between the highest received power level and ½× the index angle between the adjacent EM sensor 102a-102n with the second highest received power level. The exact line of bearing is determined by processor 108 taking the ratio of the second highest received power level over the highest received power level. This ratio is then compared to a lookup table for the frequency of interest to arrive at a precise line of bearing off the bore line for EM sensor 102a-102n toward EM sensor 102a-102n with the second highest received power level.

Figure 6:
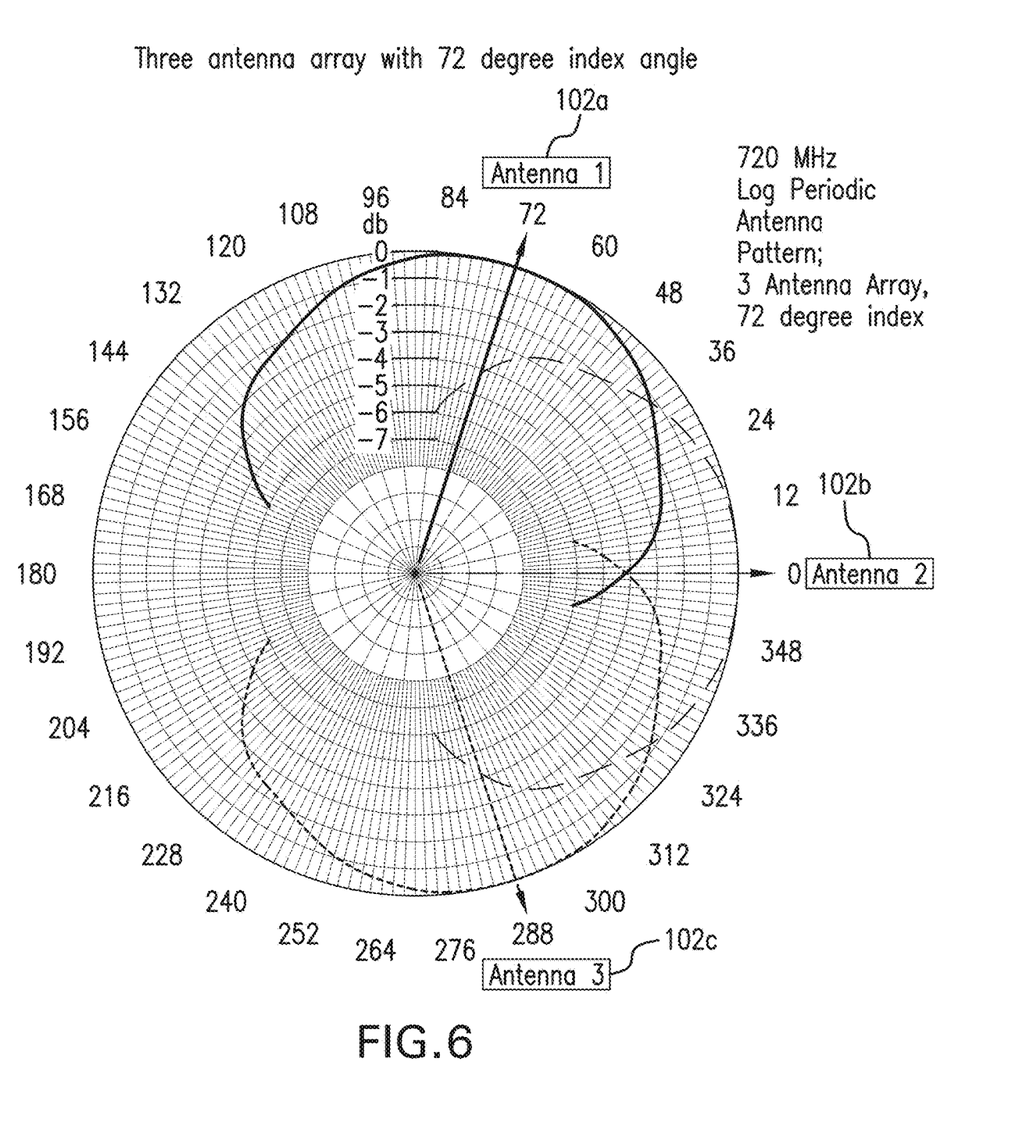
FIG. 6 is a polar graph showing a three antenna array with a 72 degree index angle.

By way of example, turning to FIG. 6 which shows EM sensors 102a, 102b, 102c, at 720 MHz where received power level of EM sensor 102a is 12 db, received power level of EM sensor 102b is 8 db, and received power level of EM sensor 102c is 4 db, the line of bearing to the emitter is known to lie between EM sensor 102a and EM sensor 102b, because EM sensor 102a has the strongest received signal strength of 12 db and EM sensor 102b has the second highest received signal strength of 8 db. More precisely, the line of bearing to the emitter must lie between EM sensor 102a and ½×72 degrees, which is the index angle between EM sensor 102a and EM sensor 102b) or between 0-36 degrees (inclusive) of the bore line of EM sensor 102a toward EM sensor 102b. Processor 108 then calculates the ratio of the received power levels, 8 db/12 db and compares the ratio 2/3 at the look-up table created for 720 MHz to identify the precise angle off the bore line of the line of bearing to the emitter.

The look up table is determined by taking for each frequency of interest, for example 720 MHz, and determining a power level ratio of 0 to K (inclusive) (and any value in between this range), where K is the maximum EM sensor (e.g., antenna) reception point at boresight divided by the minimum EM sensor (e.g., antenna) reception point at an angle from boresight equal to the index angle. K is a constant of the EM sensor (e.g., antenna) design determined a priori for each frequency at which EM sensors 102 are to be used. In the example shown in FIG. 6, the Index Angle is 72 degrees, and therefore 36 degrees is the maximum extent of the calculations required. Because the EM sensors and the EM sensor index angles are all identical, the table need be generated only for boresight (0 degrees) to one-half the index angle of the array, and then used for each repeating subrange of the arrays. The calibration table is generated from EM sensor pattern data taken for each frequency or range of interest, generally by the EM sensor manufacturer or designer using a suitable EM sensor range for measurements. The EM sensor data used for the calibration table is constant, and need only be calculated at initial manufacture of EM sensor 102. Since every EM sensor 102a-102n is identical, and symmetrical on either side of boresight, the lookup table is identical for each EM sensor 102a-102n in the array off of either side of its boresight.

The accuracy of system 100 depends on the following: 1) the radiation pattern similarity of each EM sensor 102 in the array; 2) knowledge of the power/angle curve for each frequency at which the line of bearing is to be measured; and 3) the power measurement accuracy. A calibration curve can be built at installation of the system and used to correct for measurement errors for each line of bearing measurement. Of particular importance is that any form of directional EM sensor (e.g., directional antenna) may be employed as part of system 100. While the illustrated embodiment describes EM sensor 102 as log periodic antennas for illustrative purposes, system 100 is not so limited.

To obtain a line of bearing to an emitter, system 100 is used to obtain a power measurement synchronously from each EM sensor 102 and power measurement device 104 or corresponding power measurement devices 104a-104n. If a power measurement from a single EM sensor 102a-102n, as in FIG. 1, were to be taken, no information can be gleaned from it. The emitter could be at any angle relative to the boresight of EM sensor 102, but the user would have no way of correlating the signal power to the emitter location for lack of a point of reference.

Figure 3:
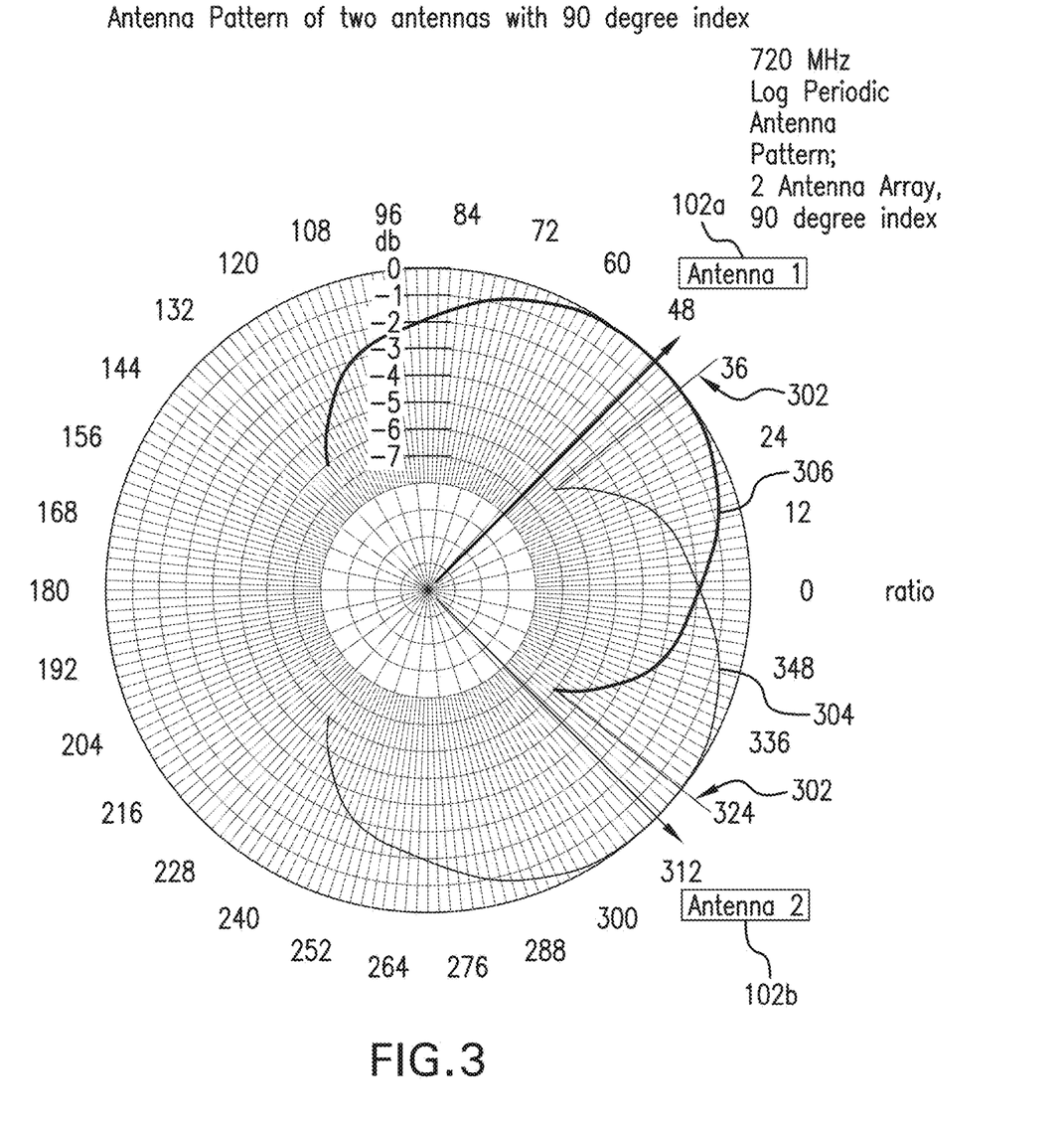
FIG. 3 is a polar graph showing an antenna pattern of two antennas with a 90 degree index.

FIG. 3 shows a graph of the pattern results if two EM sensors 102a, 102b are used, for example, each with a power measurement device 104a, 104b. The pattern from FIG. 1 for an individual EM sensor 102 is overlaid for each of two EM sensors 102a, 102b positioned with their respective boresights arranged to form a 90 degree index angle. The two EM sensors 102a, 102b are arranged horizontally separated vertically by a distance chosen to minimize interaction between the two EM sensors 102a, 102b.

The line of bearing to the unknown emitter lies in area 302 between 8 degrees clockwise from the boresight of an EM sensor implemented as antenna 1 and the boresight of EM sensor implemented as antenna 2. The amount of signal energy seen at the output of antenna 2 will vary with the angle off boresight according to the azimuthal pattern curve 304 of antenna 2. Likewise, the energy seen at the output of antenna 1 will vary from 8 degrees counterclockwise from the boresight of antenna 1 to the boresight of antenna 2 on its azimuthal pattern curve 306. Within the 74 degree azimuthal range centered between the boresights of the two EM sensors, there exists a unique mathematical ratio for any line of bearing, with the origin at the center of the polar graph of FIG. 3, and intersecting the two azimuthal response curves 304, 306. The ratio of the power output of antenna 1 and antenna 2 directly establishes the line of bearing to the emitter.

With only two EM sensors 102a, 102b, the usable line of bearing range is only 74 degrees (area 302 between identical EM sensors 102a, 102b) and only at that range within the included angle of the two EM sensors 102a, 102b. When the line of bearing falls outside of that 74 degree angle, one or both EM sensors 102a, 102b has no measurable power output, such that no ratio and line of bearing may be computed.

Figure 4A:
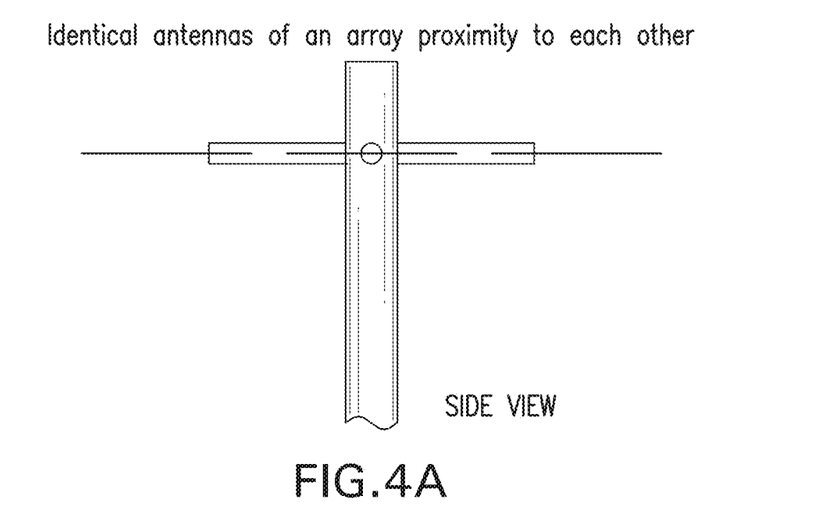
FIG. 4A is a side view of identical antennas of an array proximate to each other.
Figure 4B:
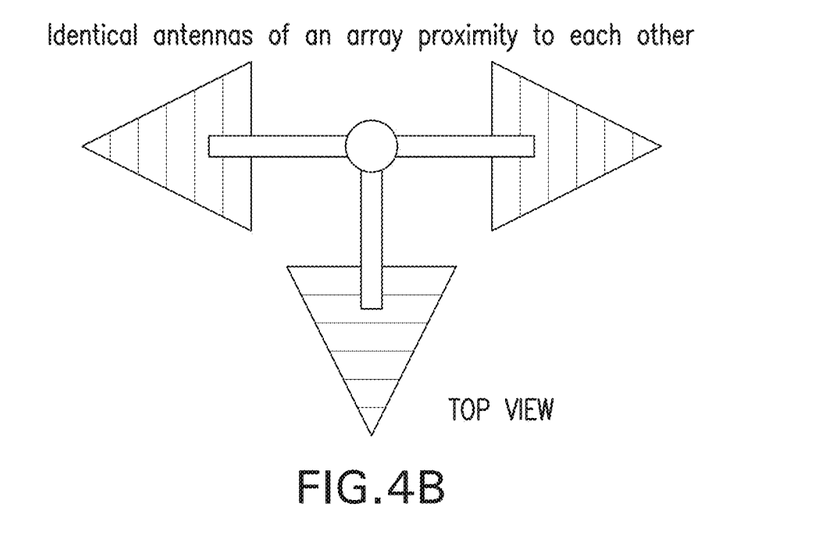
FIG. 4B is a top view of the array of FIG. 4A.
Figure 5:
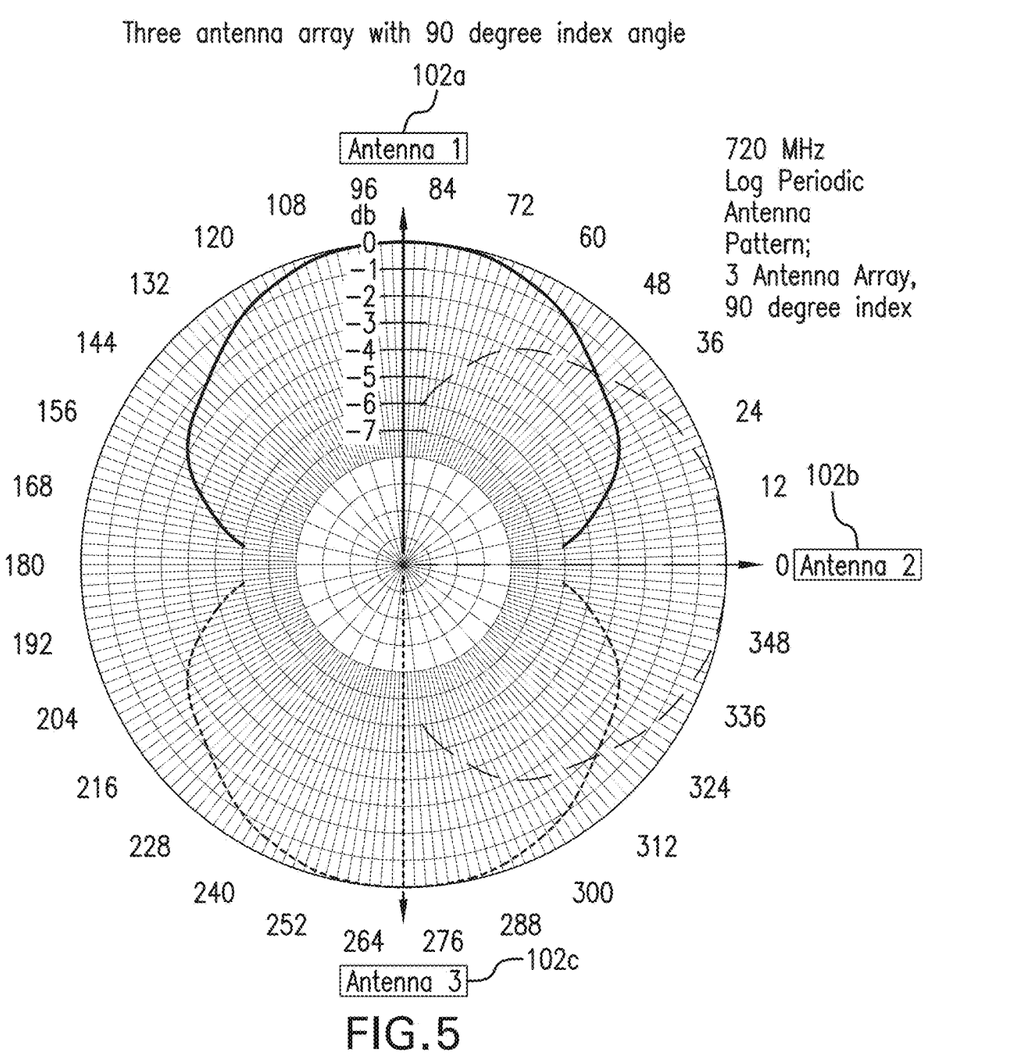
FIG. 5 is a polar graph showing a three antenna array with a 90 degree index angle.

With at least three EM sensors 102, 102b, 102c used and oriented horizontally (i.e. on a horizontal plane parallel to the ground plane) separated vertically by a distance chosen to minimize interaction between the three EM sensors 102a, 102b, 102c, as shown in FIGS. 4A-4B to form a 90 degree indexed array, as shown in the pattern plot of FIG. 5, the usable line of bearing angle lies between −82 and +82 degrees of the boresight of the center (#2) EM sensor 102b. The ratio of the two pairs of adjacent EM sensors can be calculated by recognizing that the two separated EM sensors 102a, 102c have no observable finite ratio of power, and hence provide no information. Owing to the limited ±82 degree pattern of EM sensor 102b, there is a ±8 degree region on either side of EM sensor 102b boresight where there is no ratio, hence there is an unusable region in the center of the antenna array pattern where no line of bearing can be computed.

It should be noted that while FIGS. 4A-4B show EM sensors 102 in proximity to each other, EM sensors 102 can be geographically dispersed as long as they lie parallel on the horizontal plane for determining azimuthal line of bearing to the emitter or vertical separation of one or more for determining an elevation in the line of bearing.

To eliminate the unusable region in the center of the array, FIG. 6 shows an array three EM sensors 102a, 102b, 102c, oriented at a 72 degree index angle. This eliminates the unusable ±8 degree region on either side of the boresight of antenna 2, EM sensor 102b shown in the graph of FIG. 5. This orientation provides overlapping patterns over the whole −82 to +82 degree range. Also, three antenna patterns overlap (along boresight of antenna 2 (EM sensor 102b), with antenna 1 (EM sensor 102a) and antenna 3 (EM sensor 102c) patterns overlapping). This shows that the power from antenna 2 (EM sensor 102b) must always be larger than the power from antenna 1 (EM sensor 102a) or antenna 3 (EM sensor 102c) for a valid line of bearing. When the emitter is closest to the boresight of antenna 1, antenna 2 will have a power output but antenna 3 will not have a significant power output (e.g., its output will be below a predetermined usable threshold). A similar scenario exists if the emitter is in the boresight of antenna 3 (EM sensor 102c), with a useable power output at antenna 2 (EM sensor 102), but none usable output at antenna 1 (EM sensor 102a).

The foregoing demonstrates that the number of EM sensors (and power measurement devices for them) and the index angle between them, combined with the pattern slope of the selected EM sensor or antenna type, can be traded off to obtain a line of bearing system with any degree of desired accuracy and azimuthal coverage.

Figure 7:
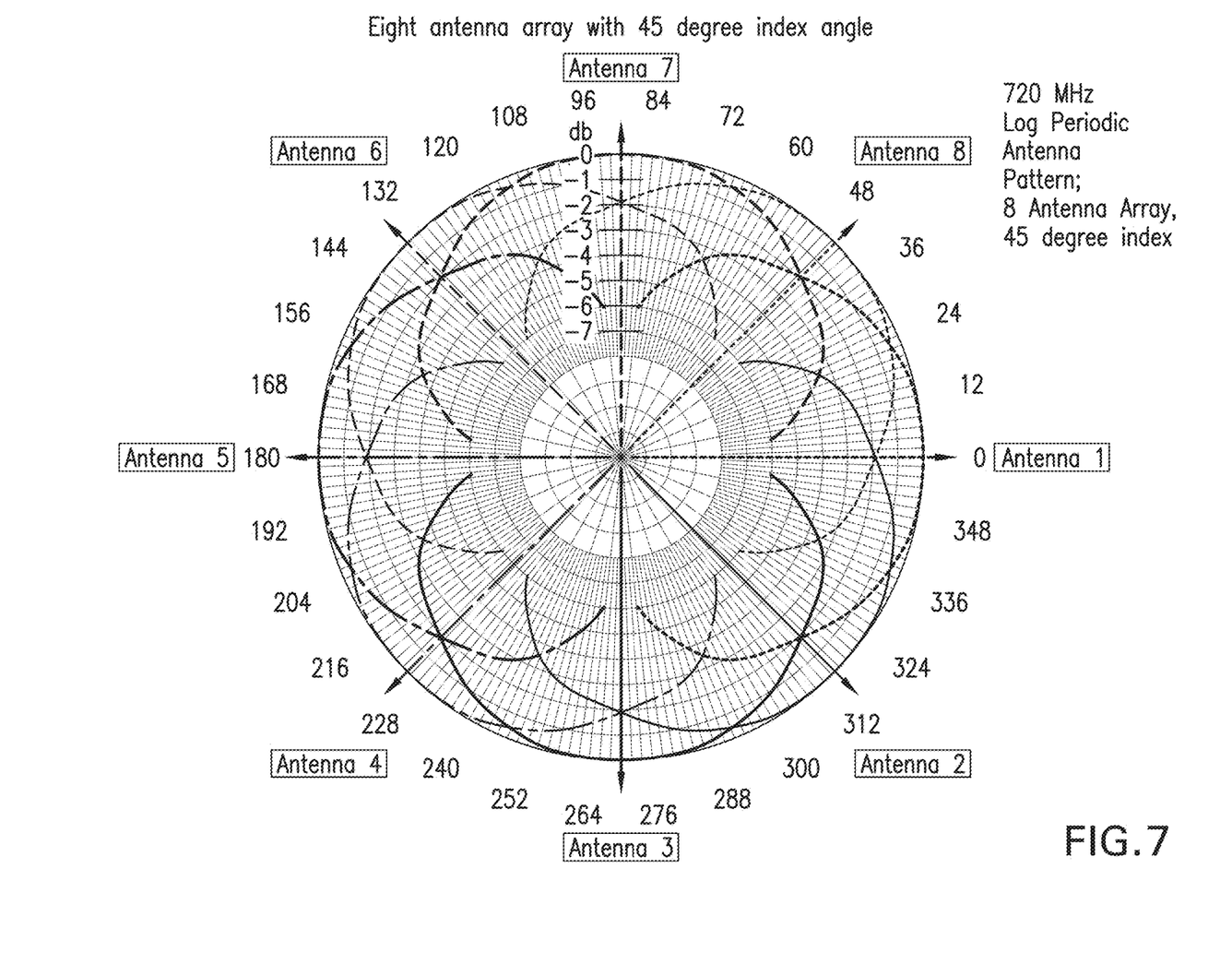
FIG. 7 is a polar graph showing an eight antenna array with 45 degree index angle.
Figure 8:
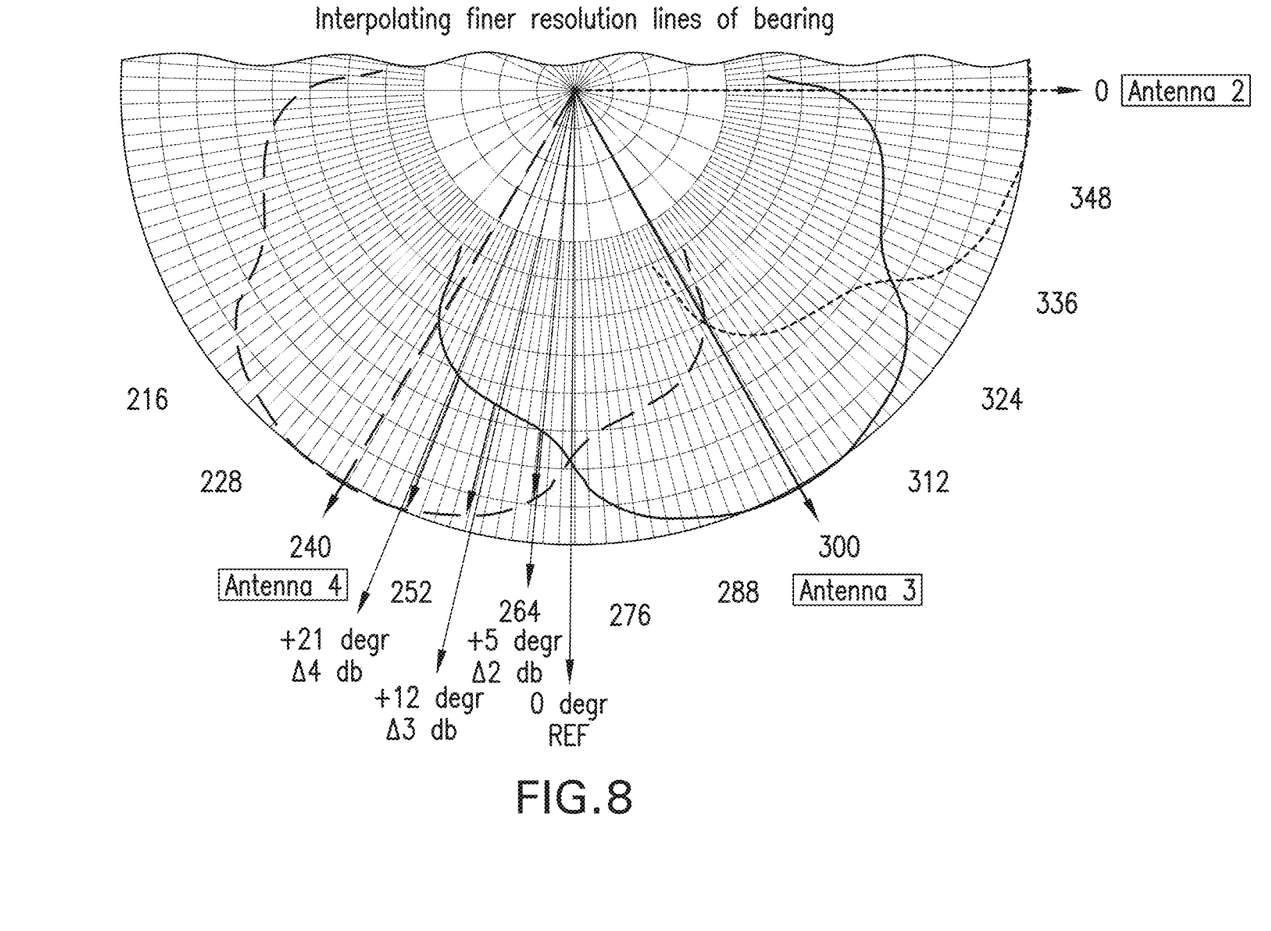
FIG. 8 is a close-up view of the graph of FIG. 7.

FIG. 7 and FIG. 8 shows an array of eight EM sensors 102 with 45 degree index and 360 degree azimuthal coverage. In this orientation there is always one unambiguous ratio available for every line of bearing, and for most of the azimuthal range, there are two sets of ratios that may be used as an averaging function and double check.

From the preceding descriptions and illustrative arrays of EM sensors 102, it is shown that the simplest method of determining the line of bearing is determining which EM sensor antenna power pair is nearest to being of equal power, e.g., a ratio of 1.0, which is the nearest line of bearing. These points will occur at integer multiples of one-half the EM sensor/antenna index angle around the coverage angle of the antenna array. A partial array may be implemented in order to reduce size and cost where omnidirectional coverage is not needed.

Figure 9:
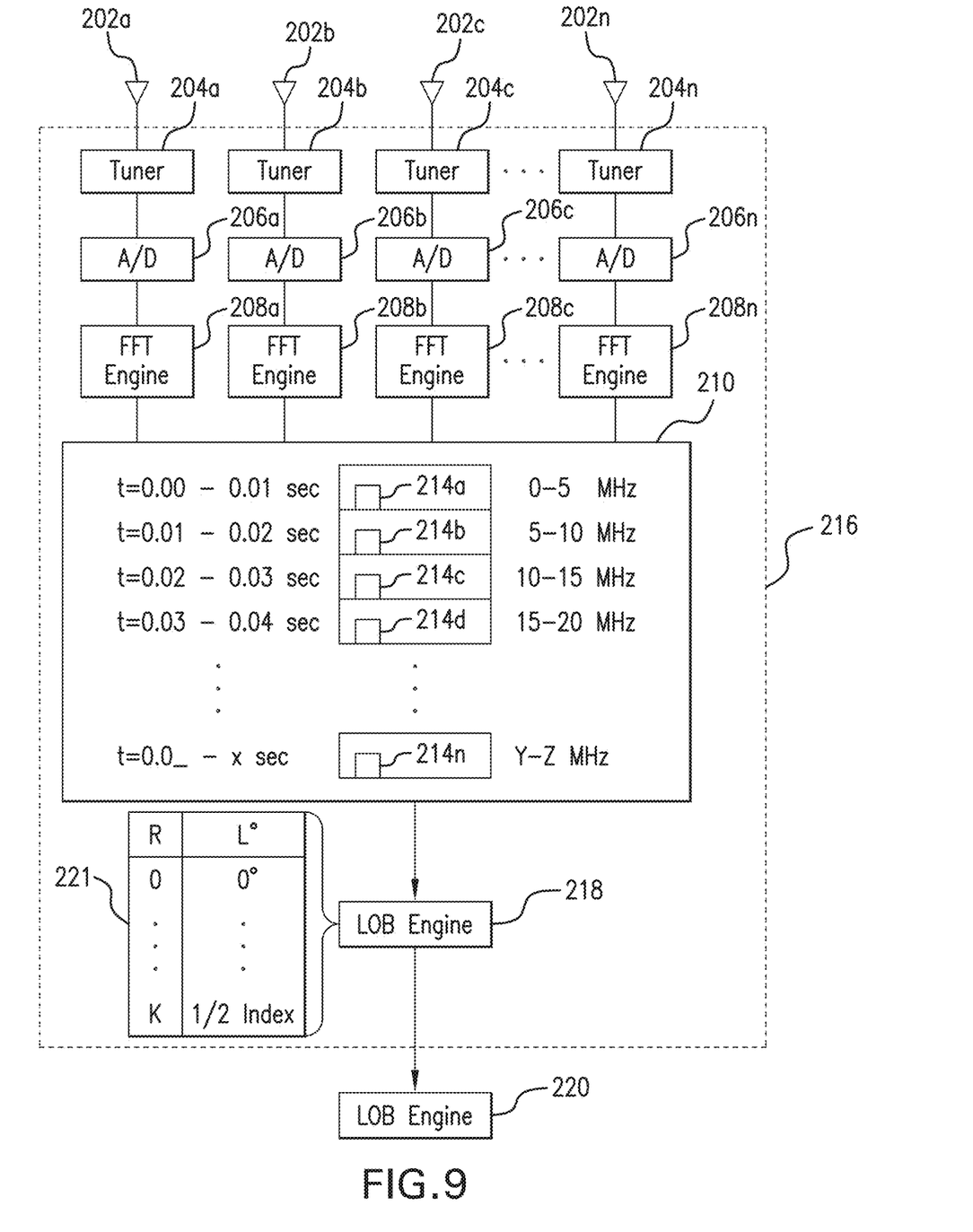
FIG. 9 is a block diagram illustrating the wideband scanning direction finding system.

FIG. 9 shows the use of the ratio for finer line of bearing determination. The line of bearing that equates to a 2, 3 and 4 db difference between the two pattern curves is shown. That incremental line of bearing will apply about both sides of each integer multiple of half the index angle.

System 100 uses identical EM sensors 102a-102n for each element of the array, and precise power measurements among the power measurement devices 104a-104n connected to each of the corresponding EM sensors 102a-102n of the array. Variations or nonlinearities in the patterns of EM sensors 102 are inconsequential as long as all EM sensors 102 have the same radiation pattern and nonlinearity. System 100 further requires that the pattern be calibrated for each frequency for line of bearing determination if angular determination finer than half the index angle is to be measured.

System 100 can be implemented as a wideband direction finding system 200 that can simultaneously determine the line of bearing to all emitters active within its bandwidth. An array of electromagnetic sensors (EM sensors), illustrated as directional antennas 202a-202n is provided where each antenna 202a-202n has a substantially identical radiation pattern, as described above.

The output of each of antennas 202a-202n in the array is provided to a directional receiver 216. Directional receiver 216 can comprise one or more processors to carry out the signal processing functions described below or receiver can be connected to an external processor to do the same.

Directional receiver 216 is connected to antennas 202a-202n to receive the EM signal detected by the array of antennas 202a-202n and provide to corresponding tuner 204a-204n or alternatively to a single tuner 204 that is rapidly switched to each of antenna 202a-202n. Included in or separate from each tuner 204a-204n can be a band limiting filter to provide only a frequency range of interest from each antenna 202a-202n at the output of each tuner 204a-204n. Each tuner 204a-204n supplies an analog signal at a specific frequency range of interest to an associated analog-to-digital converter (A/D) 206a-206n, the digital output of which is directly coupled to a very large Fast Fourier Transform (FFT) engines 208a-208n. The outputs of all FFT engines 208a-208n are coupled to storage memory 210, which is segmented into frequency bands 212a-212n into which data relating to the signal power is stored in frequency bins 214a-214n.

FFT engines 208a-208n can be implemented in processors in receiver 216, as further discussed below. FFT engines 208a-208n can convert large numbers of samples, meaning that receiver 216 can process very large bandwidths, for instance 5 MHz wide. With a 5-MHz-wide bandwidth, the FFT would be on the order of 8,000, an 8K FFT, which results in a bin size down to about 610 Hz. By using a larger FFT, such as a 16K FFT, for a relatively wide 5 MHz front end, one could obtain an even smaller bin size of 313 Hz. For a 16K FFT, one obtains 16,384 bins containing amplitude information (i.e, power level information). Each of the 16,384 bins across 5 MHz provides for ample coverage over the frequency band such that for each 305-Hz bin each one containing the amplitude value for the sampled time period.

If, for instance, as to the storage memory 210, processor in receiver 216 samples from zero to 0.01 seconds, that corresponds to a band from 0 to 5 MHz and stores the FFT output. As shown at 214b, if processor in receiver 216 samples from 0.01 to 0.02 seconds, one would cover the 5- to 10-MHz band, again with the measurements being stored. As shown at 214c and 214d, if one samples between 0.02-0.03, or 0.03-0.04 seconds, one would cover 10 to 15 MHz and 15 to 20 MHz. Thus, for each sampling interval, one can sample a different 5 MHz band, with cycling through the different bands being referred to as scanning. Having performed the aforementioned scanning, processor in receiver 216 performs the very large FFT using FFT engines 208a-208n on the results and stores the data in storage memory 210. In this manner, the lines of bearing for a large number of subchannels within a frequency band of interest can be determined simultaneously.

With the amplitude/power level information for each of antennas 202a-202n, a line of bearing (LOB) engine 218 can, for any particular point in time, determine which antennas 202a-202n have received the signals with the highest amplitude and the second highest amplitude, determine the ratio of those amplitudes in the manner described above with respect to system 100, and then compare the determined ratio with values stored in a lookup table 221 to determine the angle off of boresight of antenna 202a-202n with the highest amplitude toward antenna 202a-202n with the second highest amplitude. The output of a line of bearing is provided as an output 220 of processor 216. The LOB can be in the azimuth.

System 100 and system 200 can both be extended to capture elevation in addition to azimuth direction for a precise three-dimensional line of bearing by adding to the array n-antennas 202n at different elevation angles (each of which n-antennas has its own corresponding tuner 204n, A/D 206n, FFT Engine 208n, etc.) and computing the power variation due to the elevation angle displacement to the emitter identically to and simultaneously with the azimuth measurement. As with the azimuth antenna array, a partial array may be constructed and used similarly where full hemispherical coverage is not necessary.

In this regard, system 200 can rapidly detect the azimuth and elevation of a number of incoming EM signals from one or more emitters such that the presence and location of the emitter(s) can be determined in lines of bearing. Tuners 204a-n pre-tuned to different pre-selected bands can simultaneously provide analog signals to corresponding A/D 206a-n, which convert the time domain information from antennas 102a-n into frequency domain information. FFT engines 208-208n for each A/D 206a-n process and generate a number of FFT signals corresponding to the number of antennas 202a-n for storage in storage memory 210. LOB engine 218 ascertains the azimuth and elevation line of bearing for the EM signals of interest by a ratio of the power level of the EM signal relative to an index angle between antennas 202a-n stored in a lookup table.

Reference may also have been made throughout this disclosure to "one embodiment," "an embodiment," or "embodiments" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments. In this regard, the systems and devices disclosed in connection with system 100 apply to system 200. Moreover, devices described as being separate devices can be separate elements or combined in a single device and vice versa.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

I claim:

1. A wideband direction finding system for determining a line of bearing to an emitter of an electromagnetic (EM) signal, the system comprising:
   at least three EM sensors comprising substantially identical radiation patterns separated in a horizontal plane by an index angle;
   at least one power measurement device connected to the at least three EM sensors for determining a power level of the EM signal at each of the at least three EM sensors;
   a processor connected to the at least one power measurement device to receive the power level of the EM signal at each of the at least three EM sensors and to calculate a ratio of the power level of the EM signal at adjacent EM sensors of the at least three EM sensors;
   a line of bearing engine containing a lookup table comprising for each frequency of a plurality of frequencies a ratio between 0 and K, inclusive, where K is a constant of the EM Sensor of the at least three EM sensors at each frequency of the plurality of frequencies, and a corresponding angle between 0 and ½ times the index angle, inclusive, and configured to determine the line of bearing to the emitter from the ratio of the power level.

2. The system of claim 1, wherein the at least three EM sensors are each directional antennas.

3. The system of claim 1, wherein the ratio of the power level of the at least three EM sensors must be between 0 and K, where K is a constant of the EM Sensor of the at least three EM sensors at a particular frequency, in order to provide a solution to the line of bearing.

4. The system of claim 1, wherein the line of bearing to the emitter is determined from a lookup table stored in memory of the processor comprising a ratio between 0 and K, inclusive, where K is a constant of the EM Sensor of the at least three EM sensors at a particular frequency, and a corresponding angle between 0 and ½ times the index angle, inclusive.

5. The system of claim 1, wherein the at least three EM sensors each have an identical index angle between at least one of the other at least three EM sensors such that the line of bearing can be determined by an orientation of one of the at least three EM sensors towards another one of the at least three EM sensors.

6. The system of claim 5, and further comprising a corresponding power measurement device connected to each of the at least three EM sensors for determining a power level of the EM signal; and wherein the processor determines which of the at least three EM sensors has a highest power level and a second highest power level and determines therefrom the ratio of the power level of the EM sensors and from the ratio of the power level determines the line of bearing to the emitter.

7. The system of claim 6, and further comprising a lookup table stored in memory and in communication with the processor wherein the lookup table comprises a ratio between 0 and K, inclusive, where K is a constant of the EM Sensor of the at least three EM sensors at a particular frequency, and a corresponding angle between 0 and ½ times the index angle, inclusive, from which to determine the line of bearing off of a boresight of the EM sensor of the at least three EM sensors with the highest power level toward the EM sensor of the at least three EM sensors with the second highest power level.

8. The system of claim 6, and further comprising a tuner, an analog to digital converter and an FET engine in communication and associated with each of the at least three EM sensors for determining a power level of the received signal from the emitter at a particular point in time and storing an output at each frequency of a plurality of frequencies of the FFT engine in a corresponding frequency bin in storage memory.

9. The system of claim 8, and further comprising a line of bearing engine in communication with the storage memory for obtaining from the storage memory at the particular point in time the power level for the EM sensor of the at least three EM sensors with the highest power level and EM sensor with the second highest power level and determining therefrom the ratio of the power level and from the ratio of the power level determine the line of bearing to the emitter at each corresponding frequency bin.

10. The system of claim 9, wherein the line of bearing engine is in communication with a lookup table comprising a ratio between 0 and K, inclusive, where K is a constant of the EM Sensor of the at least three EM sensors at a particular frequency, and a corresponding angle between 0 and ½ times the index angle, inclusive, from which to determine the line of bearing off of a boresight of the EM sensor of the at least three EM sensors with the highest power level toward the EM sensor of the at least three EM sensors with the second highest power level.

11. The system of claim 1, and further comprising at least one elevation EM sensor comprising substantially identical radiation pattern of the at least three EM sensors and separated from the at least three EM sensors in a vertical plane, wherein the at least one elevation EM sensor is coupled to the at least one power measurement device for determining the power level of the EM signal, and wherein the processor receives the power level of the EM signal at the at least one elevation EM sensor and determines a variation in the power level of the EM signal simultaneous to and with respect to the power level of the EM signal at the at least three EM sensors.

12. A method for determining a line of bearing to an emitter of an electromagnetic (EM) signal based on a power level of the EM signal, the method comprising:
  determining the power level of the EM signal at at least three EM sensors each of which comprising substantially identical radiation patterns separated in a horizontal plane by an index angle;
  identifying which of the at least three EM sensors is oriented most directly toward the emitter based on the power level of the EM signal at the at least three EM sensors;
  providing a lookup table comprising for each frequency of a plurality of frequencies a ratio between 0 and K, inclusive, where K is a constant of the EM Sensor at each frequency of the plurality of frequencies, and a corresponding angle between 0 and ½ times the index angle, inclusive; and
  determining the frequency of the EM signal and the line of bearing to the emitter based on a ratio of the power level of the EM signal from two EM sensors of the at least three EM sensors relative to an index angle between the two EM sensors.

13. The method of claim 12, wherein each of the at least three EM sensors comprises a boresight, and wherein determining the line of bearing to the emitter further comprises determining which of the at least three EM sensors is most directly oriented toward the emitter based on which of the at least three EM sensors is receiving the EM signal at the highest power level.

14. The method of claim 12, wherein determining the line of bearing to the emitter further comprises determining which of the at least three EM sensors is second-most directly oriented toward the emitter based on which of the at least three EM sensors is receiving the EM signal at a second-highest power level.

15. The method of claim 14, wherein determining the line of bearing to the emitter further comprises calculating a ratio of the power level from: (i) the power level of the EM signal received by the EM sensor receiving the EM signal at the highest power level; and (ii) the power level of the EM signal received by the EM sensor receiving the EM signal at the second-highest power level.

16. The method of claim 15, wherein determining the line of bearing to the emitter further comprises comparing the ratio of the power level to a lookup table to determine an angle off of a boresight of the EM sensor receiving the EM signal at the highest power level toward the EM sensor receiving the EM signal at the second-highest power level.

17. The method of claim 12, obtaining a lookup table comparing the ratio of the power level of the EM signal from two EM sensors with an angle off of a boresight of one of the EM sensors, wherein the angle off of the boresight ranges between 0° to ½ index angle, inclusive, between the two EM sensors, and wherein the ratio of the power level in the lookup table ranges from 0 to K, inclusive, where K is a constant of the EM Sensor of the at least three EM sensors at a particular frequency.

18. The method of claim 12, and further comprising determining the power level of the EM signal with an elevation EM sensor separated from the at least three EM sensors in a vertical plane and determining a variation in the power level of the EM signal simultaneous to and with respect to the power level of the EM signal at the at least three EM sensors and determining therefrom an elevation in the line of bearing to the emitter.

* * * * *